July 7, 1936.                    A. H. RZEPPA                    2,046,584
                                UNIVERSAL JOINT
                        Filed Aug. 8, 1934          2 Sheets-Sheet 1

Fig.7            Fig.8            INVENTOR
                                  Alfred H. Rzeppa
                    BY   Whittemore Hulbert
                         Whittemore & Belknap
                                  ATTORNEYS Patented July 7, 1936

2,046,584

UNITED STATES PATENT OFFICE 2,046,584

UNIVERSAL JOINT

Alfred H. Rzeppa, Detroit, Mich.

Application August 8, 1934, Serial No. 739,011

3 Claims. (Cl. 64—21)

The invention relates to universal joints of the type comprising spherically engaged inner and outer members coupled to each other by a series of balls engaging registering meridian race grooves in said members. One important advantage in this type of construction is that the speed of rotation of the drive and driven members remains always the same, in whatever position of angular adjustment between the axes of rotation of the two members. This, however, is dependent upon maintaining the plane of the balls so as to bisect the angle between the axes of the members. With certain constructions heretofore devised, this effect has been approximated by placing between the spherical faces of the inner and outer members a concentric spherical cage member circumferentially slotted to hold the balls. However, such construction has no means of positively moving the cage during relative angular adjustment of the driving and driven members and particularly where this adjustment is through only a limited angle from axial alignment. This is due primarily to the fact that there are unavoidable clearances between the engaging surfaces of the several members which change the structure from that of a true geometrical construction.

It is the object of the invention to provide a universal joint of the above type with means for positively moving the balls so that the plane thereof always exactly bisects the angle between the axes of the driving and driven member. This may be accomplished by many different specific constructions, all of which, however, have a common principle of operation and include the same basic geometrical construction.

In the drawings:

Figs. 2, 3, 4, 5, 6, 7 and 8 are diagrams illustrating the application of this principle to a universal joint but with various specific constructions;

Figure 9:
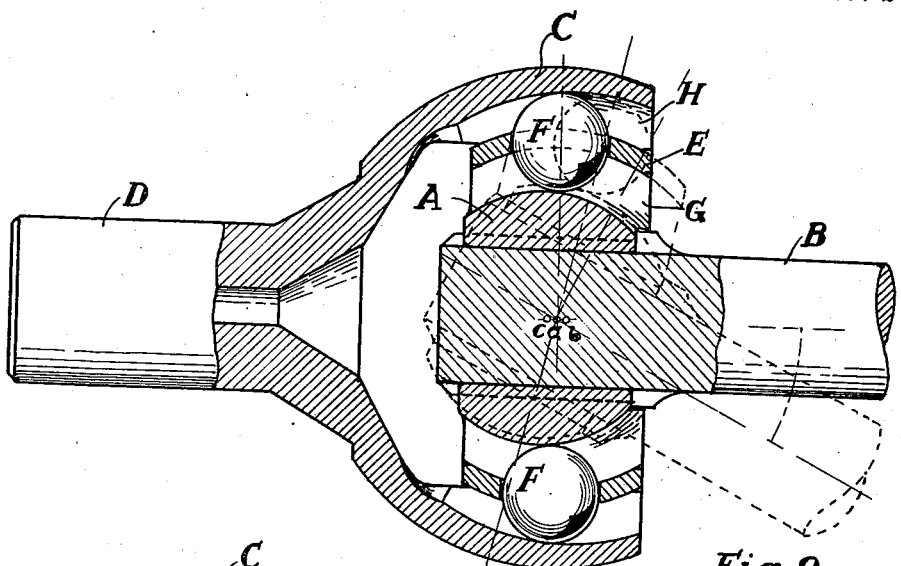
Fig. 9 is a longitudinal section through a universal joint embodying the geometrical construction of Fig. 3.
Figure 10:
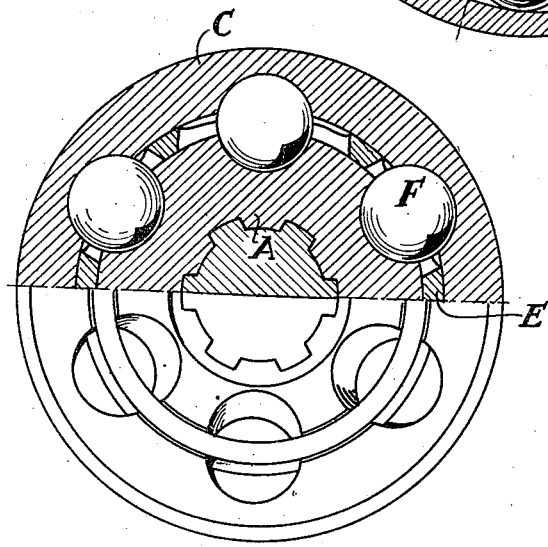
Fig. 10 is a cross section thereof on the line 10—10, Fig. 9.

As shown in Figs. 9 and 10, A is the inner spherical member which is splined or otherwise secured to a shaft B. C is the outer spherical socket member which is attached to a shaft D and E is a spherical cage member interposed between the members A and C. F are balls engaging segmental circumferential slots in the cage member and G and H are registering meridian ball race grooves in the members A and C. With constructions heretofore used, such for instance as that shown in my former Patent 1,665,280, of April 10, 1928, the spherical surfaces of the members A, C and E are all concentric and also the meridian grooves are longitudinally curved from this same center. However, with the construction shown in Fig. 9, the grooves G and H are not longitudinally curved to be concentric with this same center, but are respectively concentric with points in the axes of the members A and C symmetrically arranged on opposite sides of the center for the spherical surfaces of said members. This construction compels movement of the cage E so that the plane of the balls always bisects the angle between the axes of the shafts D and B, as will be hereinafter explained.

Figure 1:
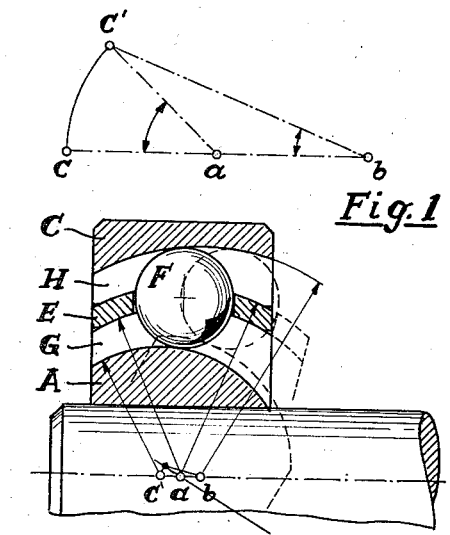
Fig. 1 is a diagram illustrating the basic geometrical principle involved in my improved construction.

The basic geometrical principle involved is illustrated in Fig. 1 in which $b$ and $c$ are points in a straight line $b$—$c$ which are equal distant from a central point $a$. If from the point $c$ an arc is drawn with a radius $a$—$c$ to a point $c'$ and the points $b$—$c'$ are connected by a straight line, then whatever position the point $c'$ may lie in the arc, the angle $c$, $a$, $c'$ will always be exactly twice the magnitude of the angle $c$, $b$, $c'$.

Figure 3:
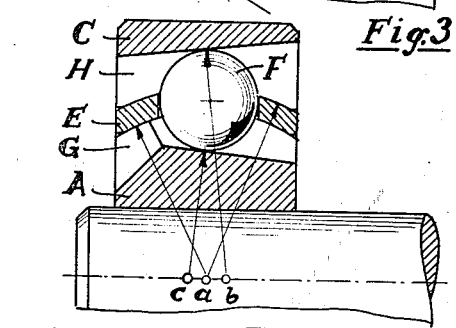

Applying this principle to the construction shown in Fig. 3, which is a diagrammatic representation of Fig. 9, the spherical surfaces of the members A, C and E are concentric with the point $a$, the longitudinal curvature of the race G in the member A, concentric with the point $c$ to the left of the point $a$ and the longitudinal curvature of the race H in the member C is concentric with the point $b$ which is to the right of the point $a$ an equal distance to that between $a$, $c$. The effect of an angular adjustment of the axis of the member A with respect to that of the member C is shown in dotted lines and it will be noted that the longitudinal curvature of the race members G and H will force the ball F to a dotted position which is exactly one-half the angular movement of the member C to its dotted position. This relation will be true for every position of angular adjustment.

Figure 2:
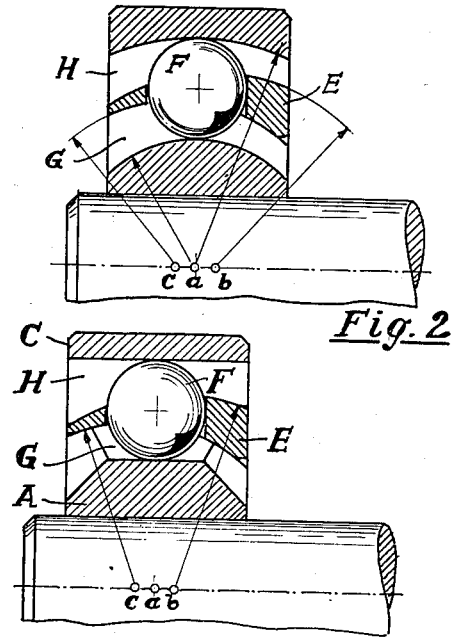
Figure 4:
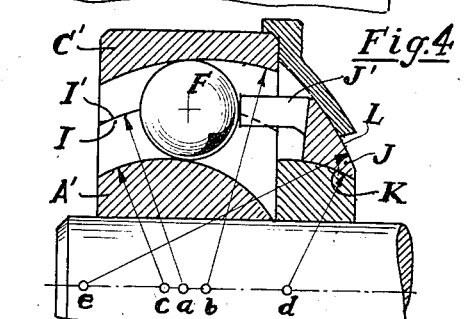
Figure 5:
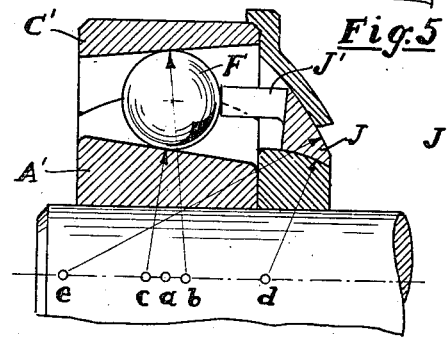

In Fig. 2 is the same arrangement of the three centers, $a$, $b$, $c$, but the longitudinal curvature of the race grooves G and H is concentric with the point $a$, while the inner spherical face of the cage member E is concentric with the point $c$ and its outer face with the point $b$. This will have precisely the same effect in compelling a movement of the cage member E and the balls carried thereby exactly one-half the angular movement of the member C with respect to the member A. Fig. 4 shows a construction similar to Fig. 3 with the exception that in place of forming the race grooves G and H concentric with the point $a$, these are formed by straight lines, or in other words, are curves of an infinite radius. The effect will be the same for the non-parallel curvature of the member E will act as a cam, forcing the ball F to move exactly one-half the relative angular movement of the members A and C. In Fig. 5, the spherical surfaces of the members A, C and E are concentric with the point $a$ the same as in Fig. 3, but the race grooves G and H are normal to lines drawn from the points $b$, $c$, to the points of tangency with the ball F. All of these constructions therefore operate upon the same principle which briefly described, is that the curvature in an axial plane of the several contact surfaces is non-parallel and such as to create three distinct centers of movement, two of which are arranged symmetrically with respect to the third.

Figure 6:
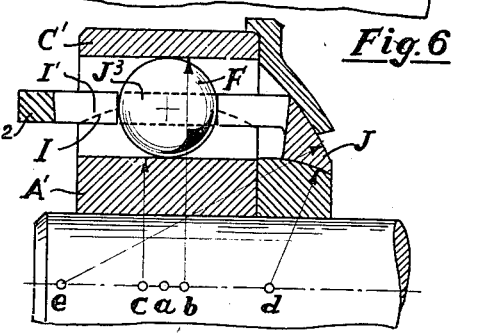

In all of the constructions thus far described, the balls are moved by a cage member interposed between the outer and inner members of the joint. In Figs. 6 to 8 modified constructions are shown in each of which the inner member A' has a spherical surface I directly engaging a spherical surface I' on the outer member C'. The balls F are moved by an external member J having inwardly extending prongs or bearings J'' for engaging the individual balls. In the specific construction shown in Fig. 6, the spherical surfaces I, I' are concentric with the point $a$ and the ball races G and H are concentric respectively with centers $b$ and $c$ similar to the construction shown in Fig. 3. The member J is provided with segmental spherical surfaces K and L respectively concentric with the points $d$ and $e$ symmetrical with respect to the point $a$, and thus during angular movement of the member A' with respect to the member C' the balls will be compelled to move in the manner before described. Fig. 7 shows a construction similar to Fig. 5 without the intermediate cage and with the construction similar to the member J for controlling the movement of the balls. Fig. 8 is a view similar to the construction shown in Fig. 4 without the intermediate cage but with the member J controlling the movement of balls on both sides thereof. Thus in the three constructions, Figs. 6, 7 and 8, the balls are controlled in Figs. 6 and 7 partly by the tapering surfaces of the ball races and partly by the member J, whereas in Fig. 8 which has no tapering surfaces, the balls must be moved from opposite sides. In this figure the member J² on the opposite side of the balls is shown as connected with the member J by a link J³, but this is only a diagrammatic representation and in the actual construction might be made in various ways.

With the construction shown in Figs. 9 and 10, which is similar to Fig. 3, the spherical surfaces of the cage member and inner and outer members are all concentric to the point $a$. The longitudinal curvature of the race G in the member A is concentric with the point $c$ to the left of the point $a$ and the longitudinal curvature of the race H in the member C is concentric with the point $b$ which is to the right of the point $a$. The points $b$ and $c$ are symmetrically arranged with respect to the point $a$, but the spacing need not be very great to produce the desired positive movement. However, in the diagrams, Figs. 2 to 8 inclusive, the spacing between the points is considerably exaggerated to more clearly demonstrate the geometrical principle involved. A joint constructed in accordance with any one of these diagrams will operate the same as that illustrated in Figs. 9 and 10. It is therefore believed unnecessary to illustrate these constructions in detail.

What I claim as my invention is:

1. In a universal joint of the type comprising spherically engaged inner and outer members having meridian ball race grooves therein, an intermediate cage member and balls mounted in said cage member engaging said grooves, means operating during relative angular movement of the rotational axes of said members for positively moving said balls so that the plane thereof always bisects the angle between said axes, said means comprising concentric spherical surfaces on the inner and outer members and intermediate cage member, and surfaces in the registering meridian grooves of the inner and outer members which in position of axial alignment of said members are non-parallel and at points of tangency with the ball are normal to points in said axes equally spaced from and on opposite sides of the common center for said inner member, outer member and cage.

2. In a universal joint of the type comprising spherically engaged inner and outer members having meridian ball race grooves therein, an intermediate cage member and balls mounted in said cage member engaging said grooves, means operating during relative angular movement of the rotational axes of said members for positively moving said balls so that the plane thereof always bisects the angle between said axes, non-parallel surfaces in the registering meridian grooves of said inner and outer members, said surfaces being respectively concentric to points in the rotational axes which are on opposite sides of and equally spaced from the common center of said inner member, outer member and cage.

3. In a universal joint of the type comprising spherically engaged inner and outer members having meridian ball race grooves therein, an intermediate cage member and balls mounted in said cage member engaging said grooves, means operating during relative angular movement of the rotational axes of said members for positively moving said balls so that the plane thereof always bisects the angle between said axes, said means comprising concentric spherical surfaces on the inner and outer members and intermediate cage member, and surfaces in the registering meridian grooves of the inner and outer member which in position of axial alignment of said members are non-parallel to said axis and incline oppositely at equal angles to said axis whereby in the angular movement of said inner and outer members said surfaces will operate as cams for compelling the balls to move one-half of said angular movement.

ALFRED H. RZEPPA.